United States Patent
Koshizako et al.

(10) Patent No.: US 12,459,458 B2
(45) Date of Patent: Nov. 4, 2025

(54) CUSHION AIRBAG DEVICE

(71) Applicant: TOYOTA JIDOSHA KABUSHIKI KAISHA, Toyota (JP)

(72) Inventors: Kenichiro Koshizako, Nagoya (JP); Jiro Ohachi, Shizuoka-ken (JP); Takuma Kawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/963,515

(22) Filed: Nov. 28, 2024

(65) Prior Publication Data
US 2025/0249857 A1 Aug. 7, 2025

(30) Foreign Application Priority Data
Feb. 1, 2024 (JP) .................. 2024-014478

(51) Int. Cl.
*B60R 21/207* (2006.01)
*B60R 21/235* (2006.01)
*B60R 21/237* (2006.01)
*B60R 21/26* (2011.01)

(52) U.S. Cl.
CPC .......... *B60R 21/207* (2013.01); *B60R 21/235* (2013.01); *B60R 21/237* (2013.01); *B60R 21/26* (2013.01); *B60R 2021/23509* (2013.01); *B60R 2021/23576* (2013.01); *B60R 2021/26094* (2013.01)

(58) Field of Classification Search
CPC ............................. B60R 21/207; B60R 21/26
See application file for complete search history.

(56) References Cited

U.S. PATENT DOCUMENTS

| 7,413,220 | B2 * | 8/2008 | Itoga | B60R 22/1952 |
| | | | | 280/741 |
| 10,220,756 | B2 * | 3/2019 | Onuma | A61H 23/04 |
| 10,632,869 | B2 * | 4/2020 | Mizuno | B60N 2/99 |
| 10,933,777 | B2 * | 3/2021 | Mizuno | B60N 2/32 |
| 11,358,553 | B1 * | 6/2022 | Kurematsu | B60R 21/207 |
| 2023/0271587 | A1 * | 8/2023 | Hofmann | B60R 21/268 |
| | | | | 280/737 |
| 2024/0286539 | A1 * | 8/2024 | Ogiso | B60N 2/914 |

FOREIGN PATENT DOCUMENTS

| JP | H07-025279 A | 1/1995 |
| JP | H10-217818 A | 8/1998 |
| JP | 2004-268692 A | 9/2004 |
| JP | 2005-104211 A | 4/2005 |
| JP | 2019-048515 A | 3/2019 |

* cited by examiner

Primary Examiner — Faye M Fleming
(74) Attorney, Agent, or Firm — SoraIP, Inc.

(57) ABSTRACT

A cushion airbag device is provided in a lower part of a seat cushion in a vehicle seat, and includes a cushion airbag inflated in a vertical direction by being supplied with gas from a pressure accumulation tank, a control valve provided in a first pipe communicating the cushion airbag and the pressure accumulation tank and adjusting an internal pressure of the cushion airbag, an exhaust valve provided in a first pipe between the control valve and the cushion airbag and exhausting gas from the inside of the cushion airbag, and a switching valve provided in a second pipe communicating the cushion airbag and the pressure accumulation tank and opened at the time of collision of the vehicle.

7 Claims, 6 Drawing Sheets

CUSHION AIRBAG DEVICE

CROSS-REFERENCE TO RELATED APPLICATION

This application claims priority to Japanese Patent Application No. 2024-014478 filed on Feb. 1, 2024, incorporated herein by reference in its entirety.

BACKGROUND

1. Technical Field

The present disclosure relates to a cushion airbag device.

2. Description of Related Art

There has been conventionally known a vehicle seat in which a buttocks support region of a seat cushion pad is supported by an air cushion including two upper and lower air bladders placed on a recessed portion of a seat cushion frame (see, for example, Japanese Unexamined Patent Application Publication No. 2004-268692 (JP 2004-268692 A)). In the vehicle seat, at a time of a collision of the vehicle, air in the air bladders is urgently exhausted, the air cushion is contracted, and the buttocks support region of the seat cushion pad is instantaneously depressed, so that the occurrence of the submarine phenomenon is suppressed.

SUMMARY

However, in a configuration in which, at the time of the collision of the vehicle, the air in the air bladders is urgently exhausted, the air cushion is contracted, and the buttocks support region of the seat cushion pad is instantaneously depressed, a waist of an occupant is instantaneously displaced toward the vehicle lower side. Therefore, the relative displacement amount between a lap belt of a seat belt and the waist of the occupant increases, which may cause a reduction in a waist restraining force by the lap belt. In addition, when the buttocks support region of the seat cushion pad is always supported by the air cushion, the hardness of the seat cushion increases, and the riding comfort (seating comfort) performance may be impaired during normal traveling of the vehicle.

The present disclosure provides a cushion airbag device that makes it possible to suppress a reduction in riding comfort performance during normal traveling of a vehicle, to reduce an amount of displacement of an occupant toward a vehicle lower side at a time of a collision of the vehicle, and to suppress a reduction in a waist restraining force by a lap belt of a seat belt.

A cushion airbag device according to a first aspect of the present disclosure includes:
- a cushion airbag that is provided at a lower portion of a seat cushion in a vehicle seat, and inflates in an up-down direction when gas is supplied from a pressure accumulation tank;
- a control valve that is provided in a first pipe communicating the cushion airbag with the pressure accumulation tank and adjusts the internal pressure of the cushion airbag;
- an exhaust valve that is provided in the first pipe between the control valve and the cushion airbag and exhausts the gas from the inside of the cushion airbag; and
- a switching valve that is provided in a second pipe communicating the cushion airbag with the pressure accumulation tank and is opened at a time of a collision of a vehicle.

According to the disclosure of the first aspect, the cushion airbag is provided at the lower portion of the seat cushion in the vehicle seat. The cushion airbag is configured to inflate in the up-down direction when gas is supplied from the pressure accumulation tank. The control valve that adjusts the internal pressure of the cushion airbag is provided in the first pipe communicating the cushion airbag with the pressure accumulator tank. The exhaust valve that exhausts gas from the inside of the cushion airbag is provided in the first pipe between the control valve and the cushion airbag. Therefore, during normal traveling of the vehicle, the internal pressure of the cushion airbag can be adjusted (including a state in which no gas is contained), and a reduction in the riding comfort performance can be suppressed.

In addition, the switching valve that is opened at the time of a collision of the vehicle is provided in the second pipe communicating the cushion airbag with the pressure accumulation tank. That is, at the time of a collision of the vehicle, gas is instantaneously supplied from the pressure accumulation tank to the cushion airbag. Therefore, the amount of displacement of the occupant toward the vehicle lower side at the time of a collision of the vehicle can be reduced, and a reduction in the waist restraining force by the lap belt of the seat belt can be suppressed. Note that the term "at the time of a collision of the vehicle" in the present disclosure includes not only when a collision of the vehicle is detected but also when a collision of the vehicle is predicted. Furthermore, the "gas" in the present disclosure includes air.

A cushion airbag device according to a second aspect of the present disclosure includes:
- a cushion airbag that is provided at a lower portion of a seat cushion in a vehicle seat, and inflates in an up-down direction when gas is supplied from a pressure accumulation tank;
- a control valve that is provided in a pipe communicating the cushion airbag with the pressure accumulation tank and adjusts the internal pressure of the cushion airbag;
- an exhaust valve that is provided in the pipe between the control valve and the cushion airbag and exhausts the gas from the inside of the cushion airbag; and
- an inflator that operates at a time of a collision of a vehicle and supplies gas to the inside of the cushion airbag.

According to the disclosure of the second aspect, the cushion airbag is provided at the lower portion of the seat cushion in the vehicle seat. The cushion airbag is configured to inflate in the up-down direction when gas is supplied from the pressure accumulation tank. The control valve that adjusts the internal pressure of the cushion airbag is provided in the pipe communicating the cushion airbag with the pressure accumulator tank. The exhaust valve that exhausts gas from the inside of the cushion airbag is provided in the pipe between the control valve and the cushion airbag. Therefore, during normal traveling of the vehicle, the internal pressure of the cushion airbag can be adjusted (including a state in which no gas is contained), and a reduction in the riding comfort performance can be suppressed.

In addition, at the time of a collision of the vehicle, the inflator that supplies gas to the inside of the cushion airbag operates. That is, at the time of a collision of the vehicle, gas is instantaneously supplied from the inflator to the cushion airbag. Therefore, the amount of displacement of the occupant toward the vehicle lower side at the time of a collision of the vehicle can be reduced, and a reduction in the waist restraining force by the lap belt of the seat belt can be suppressed. Note that the term "at the time of a collision of the vehicle" in the present disclosure includes not only when a collision of the vehicle is detected but also when a collision of the vehicle is predicted. Furthermore, the "gas" in the present disclosure includes air.

In the cushion airbag device of the first aspect, the switching valve includes a partition wall that enables the second pipe to be closed, and a stopper that supports the partition wall. The switching valve is a mechanical valve in which a support from the stopper with respect to the partition wall is instantaneously released at the time of the collision of the vehicle.

According to the above configuration, the switching valve includes a partition wall that enables the second pipe to be closed, and a stopper that supports the partition wall. The switching valve is a mechanical valve in which a support from the stopper with respect to the partition wall is instantaneously released at the time of a collision of the vehicle. Therefore, the supply of the gas to the cushion airbag can be performed more quickly than in the case where the switching valve is a solenoid valve, and the waist restraint by the lap belt of the seat belt can be achieved earlier.

In the cushion airbag device of the above aspect, when the vehicle body vertical acceleration exceeds a predetermined threshold during traveling of the vehicle, the control valve is opened for a predetermined time.

According to the above configuration, when the vehicle body vertical acceleration exceeds a predetermined threshold during traveling of the vehicle, the control valve is opened for a predetermined time. That is, the cushion airbag inflates at a low internal pressure. Therefore, a reduction in the riding comfort performance is effectively suppressed when the vehicle is traveling on a rough road.

In the cushion airbag device of the above aspect, the cushion airbag
  is configured in which two base fabrics are sewn along the outer peripheral edge, and are folded in two along a crease line so as to be stacked one on top of another, and
  has an intake path along the crease line and an intake port at one end of the crease line, and is fixed to a cross member provided between side frames constituting the seat cushion in a state in which the crease line is positioned on a seat front side.

According to the above configuration, the cushion airbag is configured in which two base fabrics are sewn along the outer peripheral edge, and are folded in two along a crease line so as to be stacked one on top of the other. The cushion airbag has an intake path along the crease line and an intake port at one end of the crease line, and is fixed to a cross member provided between side frames constituting the seat cushion in a state in which the crease line is positioned on the seat front side. Therefore, it is possible to increase the thickness of the cushion airbag with a limited volume. In addition, since the cushion airbag has a large thickness difference, the amount of displacement of the occupant toward the vehicle lower side at the time of a collision of the vehicle is effectively reduced, and the reduction in the waist restraining force by the lap belt of the seat belt is effectively suppressed.

As described above, according to the present disclosure, it is possible to suppress a reduction in the riding comfort performance during normal traveling of the vehicle. Furthermore, it is possible to reduce the amount of displacement of the occupant toward the vehicle lower side at the time of a collision of the vehicle, and to suppress a reduction in the waist restraining force by the lap belt of the seat belt.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment according to the present disclosure will be described in detail with reference to the drawings. For convenience of description, the arrow UP, the arrow FR, and the arrow RH appropriately shown in the figures indicate the upward direction of the vehicle seat, the front direction of the vehicle seat, and the right direction of the vehicle seat, respectively. Thus, when terms indicating directions, i.e., upward, and downward, forward, and rearward, and right and left are used in the following description without any specification, these mean upward and downward of the vehicle seat, forward and rearward of the vehicle seat, and right and left of the vehicle seat. Further, the right-left direction is synonymous with a seat width direction.

Figure 1A:
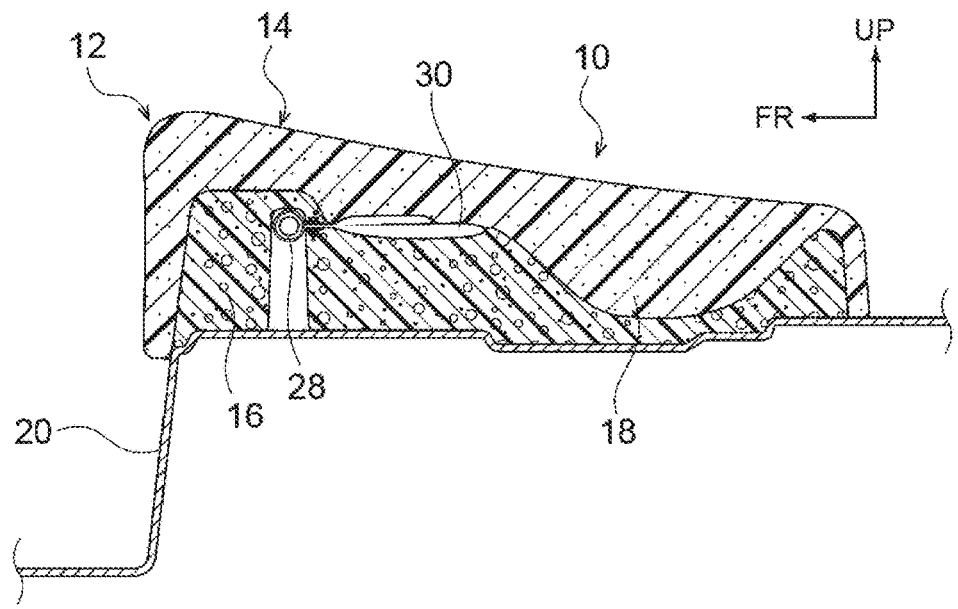
FIG. 1A is a schematic cross-sectional view illustrating an internal structure of a vehicle seat including a cushion airbag according to an embodiment of the present disclosure.

As shown in FIG. 1A, the cushion airbag 30 constituting the cushion airbag device 10 according to the present embodiment is provided at a lower portion of the seat cushion 14 in the vehicle seat 12 as, for example, a rear seat of a vehicle (not shown). The vehicle seat 12 is a bench seat, and the seat cushion 14 includes, for example, a base member 16 made of foamed polypropylene (EPP) and a cushion pad 18 made of urethane foam.

Figure 1B:
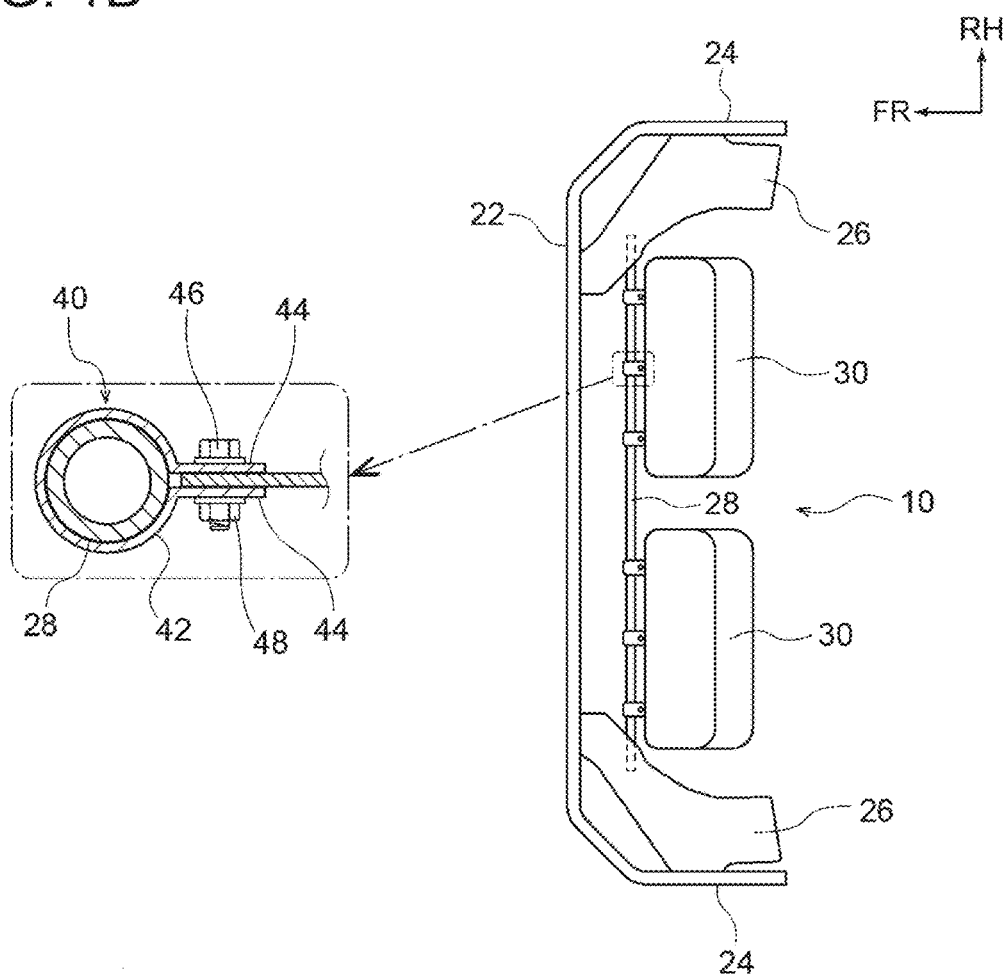
FIG. 1B is a schematic plan view illustrating an internal structure of a vehicle seat including a cushion airbag according to an embodiment of the present disclosure.

As shown in FIG. 1B, the vehicle seat 12 includes a seat frame 22 extending in the seat width direction in a plan view, and side frames 24 extending from both left and right end portions of the seat frame 22 so as to be bent toward the rear side. The seat frame 22 and the side frame 24 are fixed to a floor 20 (see FIG. 1A). A seat pan 26 having a predetermined bilaterally symmetrical shape is provided between the rear surfaces on both left and right sides of the seat frame 22 and the side surface on the inner side in the seat width direction of the side frame 24.

A cylindrical submarine prevention reinforcement (hereinafter referred to as "submarine reinforcement 28") as a mounting member is installed between the left and right seat pans 26. In the present embodiment, the seat pan 26 is also regarded as a part of the side frame 24. Therefore, it can be said that the submarine reinforcement 28 is installed between the left and right side frames 24.

Figure 2A:
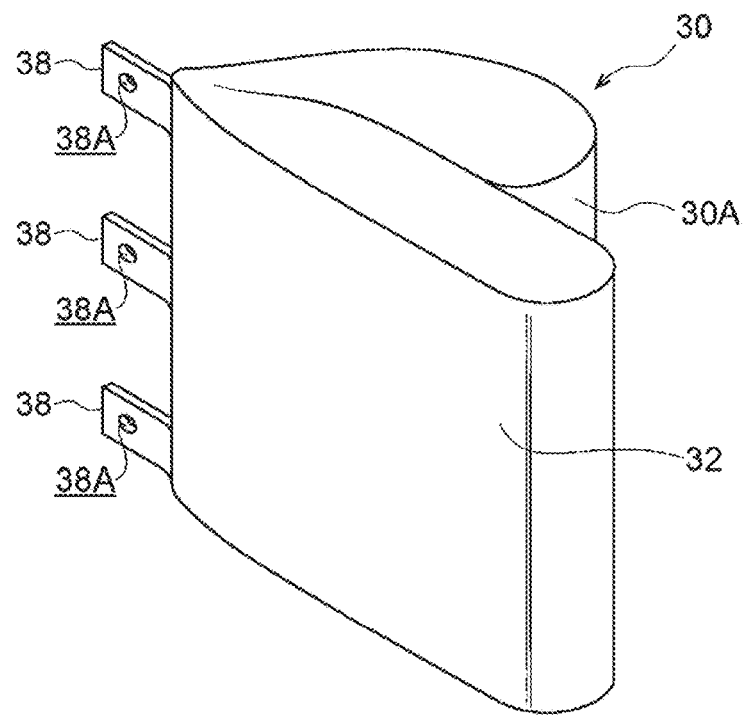
FIG. 2A is a schematic perspective view illustrating a cushion airbag according to an embodiment of the present disclosure.
Figure 2B:
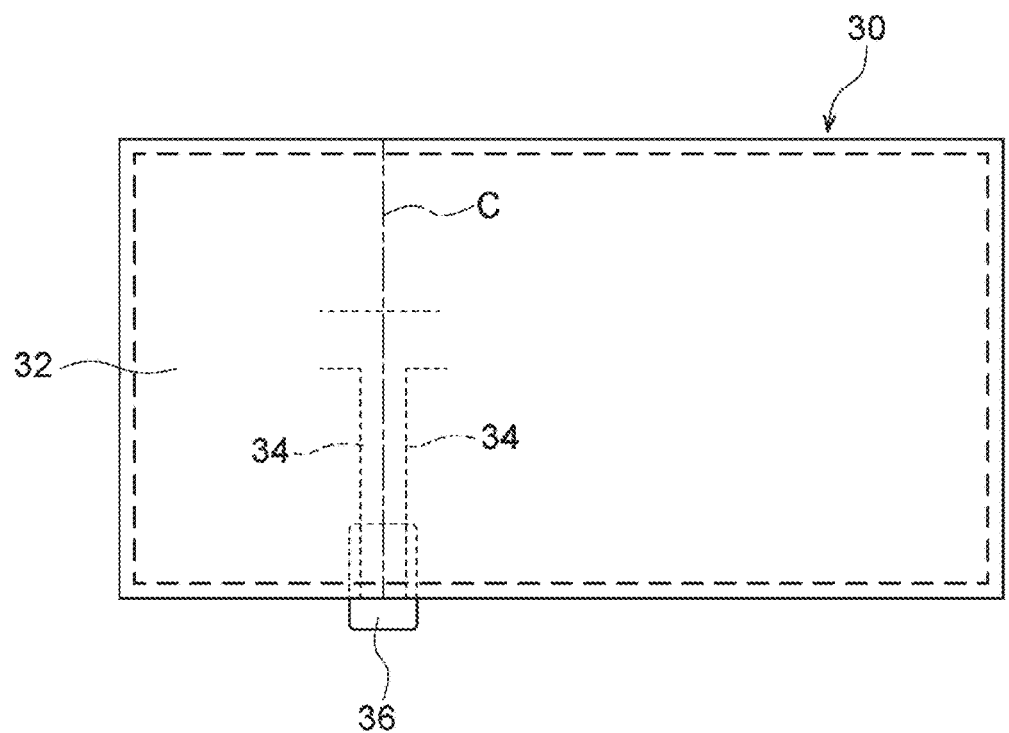
FIG. 2B is a schematic exploded view illustrating a cushion airbag according to an embodiment of the present disclosure.

The cushion airbag 30 is attached to the submarine reinforcement 28 by a metal or resin fixing band 40, a bolt 46, and a nut 48. Specifically, as shown in FIG. 2A and FIG. 2B, the cushion airbag 30 is stacked one on top of another by sewing the two silicon-coated base fabrics 32 along the outer peripheral edge and folding them into two along the crease C. A distal end portion 30A on the upper side of the airbag 30 is sewn to the lower side of the airbag 30.

The cushion airbag 30 has an intake passage 34 having a substantially "L" shape in plan view along the crease C on both sides in the longitudinal direction of the crease C. In addition, the cushion airbag 30 has an intake port 36 for supplying gas toward the respective intake passages 34 at one end portion in the longitudinal direction of the crease C. Therefore, the gas supplied from the intake port 36 is ejected through the respective intake passages 34 toward the central portions on the upper side and the lower side of the cushion airbag 30. Note that the "gas" in the present embodiment also includes air.

Further, as shown in FIG. 2A, the cushion airbag 30 is attached by sewing a plurality of (e.g., three) fixing tabs 38 at predetermined intervals at the position of the crease C. The respective fixing tabs 38 are formed in a substantially rectangular shape in plan view, for example, and a circular through-hole 38A is formed in a central portion thereof. The cushion airbag 30 is arranged so that the fixing tabs 38 (crease C) are positioned on the front side, and the fixing tabs 38 are sandwiched from above and below by a flange portion 44 of the fixing band 40, which will be described later, shown in FIG. 1B.

The fixing band 40 has a ring portion 42 having a substantially "C" shape in side view and fitted to the submarine reinforcement 28, and a pair of flange portions 44 having a substantially rectangular shape in plan view and extending radially outward from an end portion of the ring portion 42. A circular through-hole (not shown) is formed in a central portion of each flange portion 44.

Therefore, each fixing tab 38 is sandwiched between the pair of flange portions 44 of the fixing band 40 from above and below. Bolts 46 are then inserted into through-holes (not shown) and through-holes 38A (see FIG. 2A) that communicate with each other. Then, the nut 48 is screwed into the shaft portion of the bolt 46. Thus, each fixing tab 38 is fixed to the submarine reinforcement 28. Thus, the cushion airbag 30 is attached to the submarine reinforcement 28.

Figure 5A:
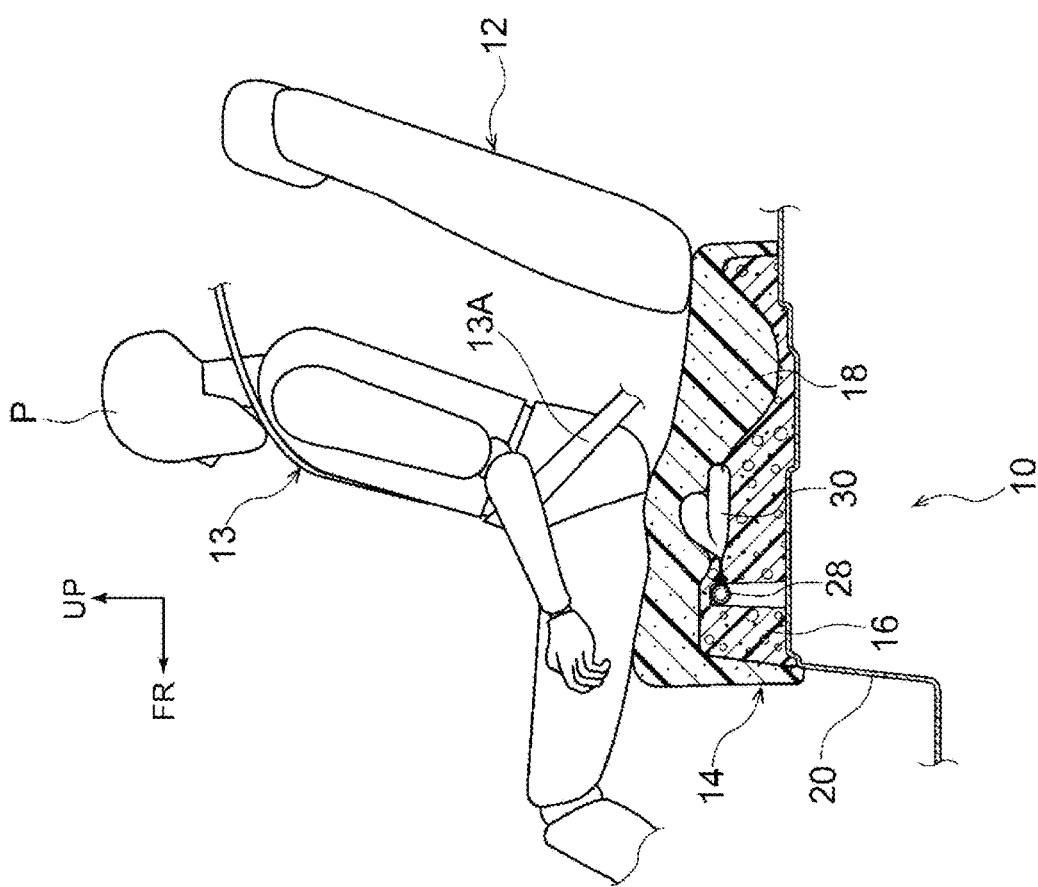
FIG. 5A is a schematic side view illustrating a state before supplying gas to the cushion airbag according to the embodiment of the present disclosure.
Figure 5B:
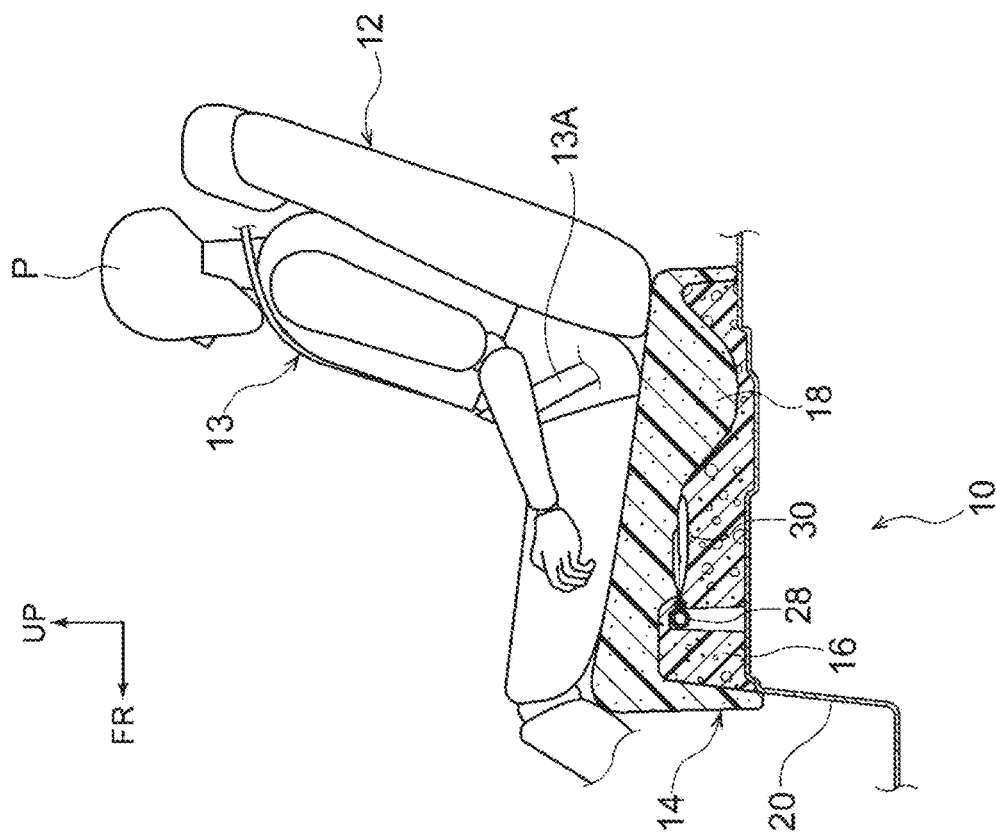
FIG. 5B is a schematic side view illustrating a state after supplying gas to the cushion airbag according to the embodiment of the present disclosure.

The cushion airbag 30 to which the fixing tabs 38 are attached to the submarine reinforcement 28 is disposed between the base member 16 and the cushion pad 18 constituting the seat cushion 14, as shown in FIG. 1A, FIG. 5A, and FIG. 5B. The cushion airbag 30 is in a state in which no gas is contained therein during normal traveling of the vehicle. The cushion airbag 30 is inflated vertically by supplying the gases to the inside, and raises a part of the cushion pad 18 (the front part of the buttocks of the occupant P) as shown in FIG. 5B.

Figure 3B:
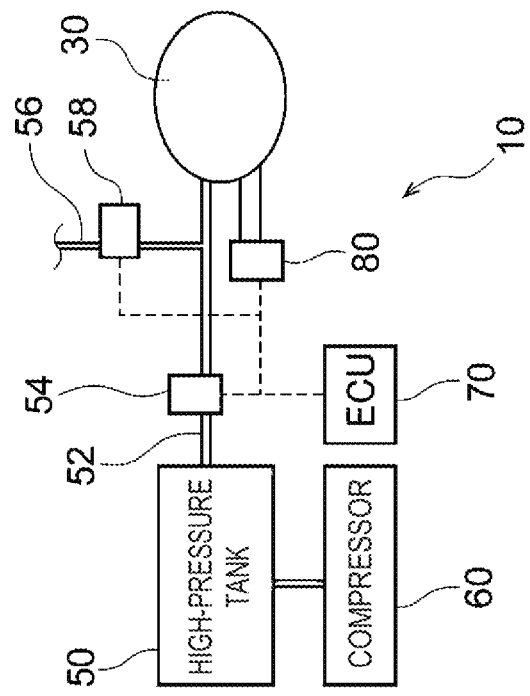
FIG. 3B is a schematic configuration diagram illustrating a cushion airbag device according to a modification of the present embodiment.
Figure 3A:
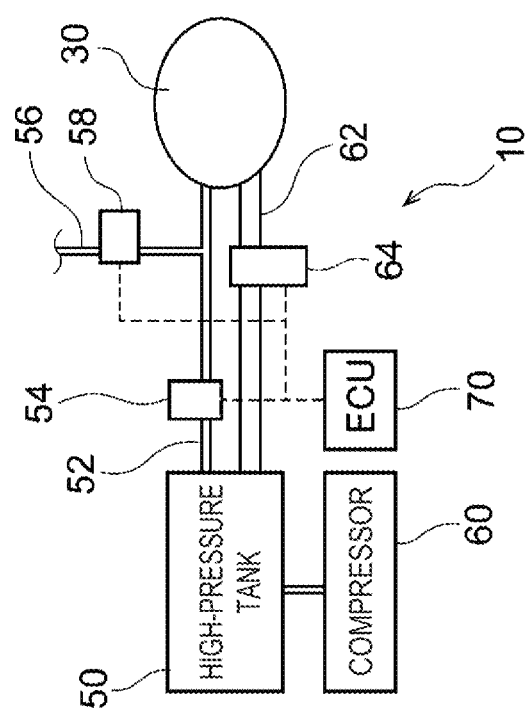
FIG. 3A is a schematic configuration diagram illustrating a cushion airbag device according to an embodiment of the present disclosure.

As shown in FIG. 3A, the vehicle (or the vehicle seat 12) is provided with a high-pressure tank 50 as a livestock pressure tank that is made high-pressure by the compressor 60. The high-pressure tank 50 and the cushion airbag 30 are connected to each other through a first pipe 52. The first pipe 52 is provided with a control valve (solenoid valve) 54 for adjusting the internal pressure of the cushion airbag 30. When the control valve 54 is opened, gas is supplied from the high-pressure tank 50 to the inside of the cushion airbag 30, and the cushion airbag 30 is inflated in the vertical direction.

Further, a branch pipe 56 is integrally provided in the first pipe 52 between the control valve 54 and the cushion airbag 30, and an exhaust valve 58 for exhausting gas from the inside of the cushion airbag 30 is provided in the branch pipe 56. Further, the high-pressure tank 50 and the cushion airbag 30 are communicatively connected to each other by the second pipe 62, and the inner diameter of the second pipe 62 is formed to be larger than the inner diameter of the first pipe 52. The second pipe 62 is provided with a switching valve 64 that is opened at the time of collision of the vehicle.

Note that the "collision of the vehicle" in the present embodiment includes not only a case where a collision of the vehicle is detected but also a case where a collision of the vehicle is predicted. Further, the "emergency braking of the vehicle" described later includes not only a case where the emergency braking of the vehicle is detected but also a case where the emergency braking of the vehicle is predicted. The control valve 54, the exhaust valve 58, and the switching valve 64 are electrically connected to a control device (ECU) 70, respectively, and are controlled to be opened and closed under the control of the control device 70.

Figure 4A:
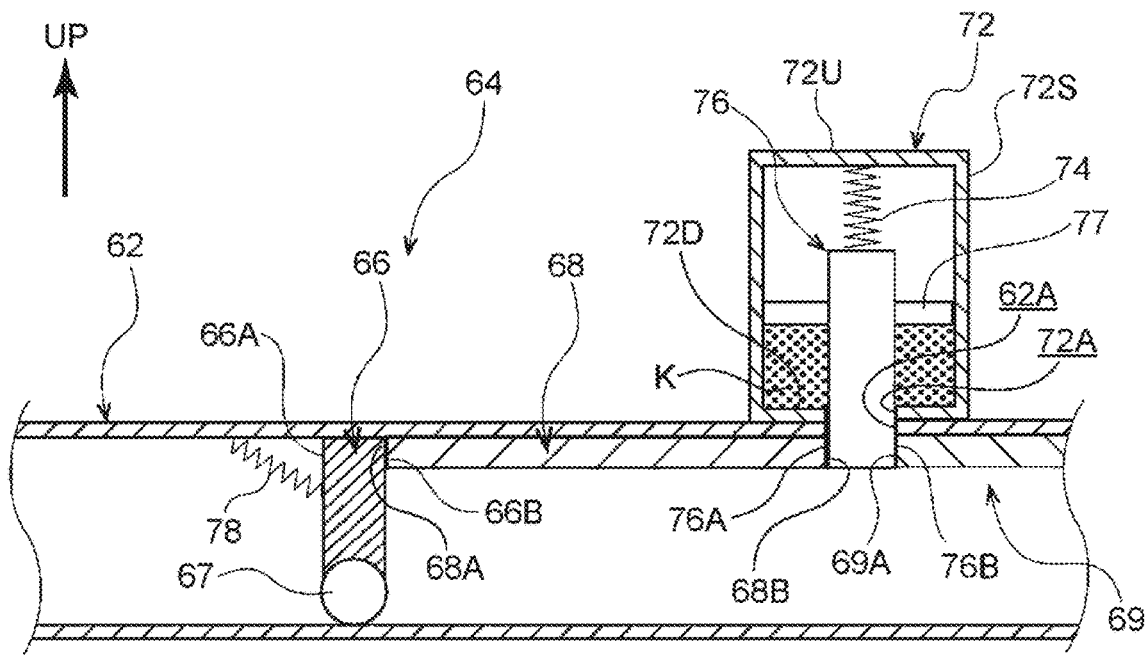
FIG. 4A is a schematic configuration diagram illustrating a switching valve before supplying gas for the cushion airbag device according to the embodiment of the present disclosure.

Here, the switching valve 64 is, for example, a mechanical valve configured to include a partition wall 66 and a stopper 68 of a predetermined thickness in the second pipe 62 as shown in FIG. 4A. The partition wall 66 has a size capable of closing the passage of the second pipe 62. The stopper 68 has a predetermined size which supports the partition wall 66 from the downstream side (hereinafter, simply referred to as "downstream side") in the outflow direction of the gas so as not to be collapsed by the high-pressure gas flowing out of the high-pressure tank 50 (having an area larger than an area of an opening 62A to be described later)

The partition wall 66 is supported so as to be rotatable about a rotation shaft 67 whose axial direction is a direction orthogonal to the extending direction of the second pipe 62 in a plan view. One end of a tension-coil spring 78 serving as a return biasing member is attached to a wall surface 66A on an upstream side (hereinafter, simply referred to as an "upstream side") in the gas outflow direction at an upper end portion of the partition wall 66. The other end portion of the tension-coil spring 78 is attached to the upper inner wall of the second pipe 62 on the upstream side of the partition wall 66.

The stopper 68 is provided on the upper inner wall of the second pipe 62 on the downstream side of the partition wall 66 so as to be slidable along the extending direction of the second pipe 62. A hollow case 72 is integrally provided at an upper portion of the second pipe 62 on the downstream side of the partition wall 66. On the inner surface of the upper wall 72U of the case 72, one end portion (upper end portion) of the compression-coil spring 74 as a biasing member for projection is attached, the other end portion (lower end portion) of the compression-coil spring 74 is attached to the upper end surface of the substantially flat plate-shaped restricting member 76.

That is, the restricting member 76 is biased downward by the compression-coil spring 74, and protrudes downward from the opening 72A formed in the lower wall 72D of the case 72 and the opening 62A formed in the upper portion of the second pipe 62. The downstream-side end surface 68B of the stopper 68 is in contact with the upstream-side wall surface 76A of the lower end portion of the restricting member 76 protruding from the opening 72A of the lower wall 72D and the opening 62A of the second pipe 62.

The downstream-side wall surface 76B of the lower end portion of the restricting member 76 is in contact with or close to the upstream-side end surface 69A of the restricting member 69 fixed to the upper inner wall of the second pipe 62. This limiting member 69 is adapted to limit unnecessary sliding of the stopper 68 downstream, as shown in FIG. 4B.

In this condition, the upstream end surface 68A of the stopper 68 abuts against the downstream wall surface 66B of the upper end portion of the partition wall 66. Thus, the partition wall 66 is supported by the stopper 68 so as not to fall down to the downstream side by the high-pressure gas flowing out from the high-pressure tank 50.

Further, a flange portion 77 is integrally formed on the upper portion of the restricting member 76, and an outer peripheral end surface of the flange portion 77 abuts against an inner surface of the side wall 72S of the case 72. Between the flange portion 77 of the restricting member 76 and the lower wall 72D of the case 72, the explosive K is filled, the case 72, an ignition device for igniting the explosive K (not shown) is provided. The ignition device is electrically connected to a control device 70 (refer to FIG. 3A).

Figure 4B:
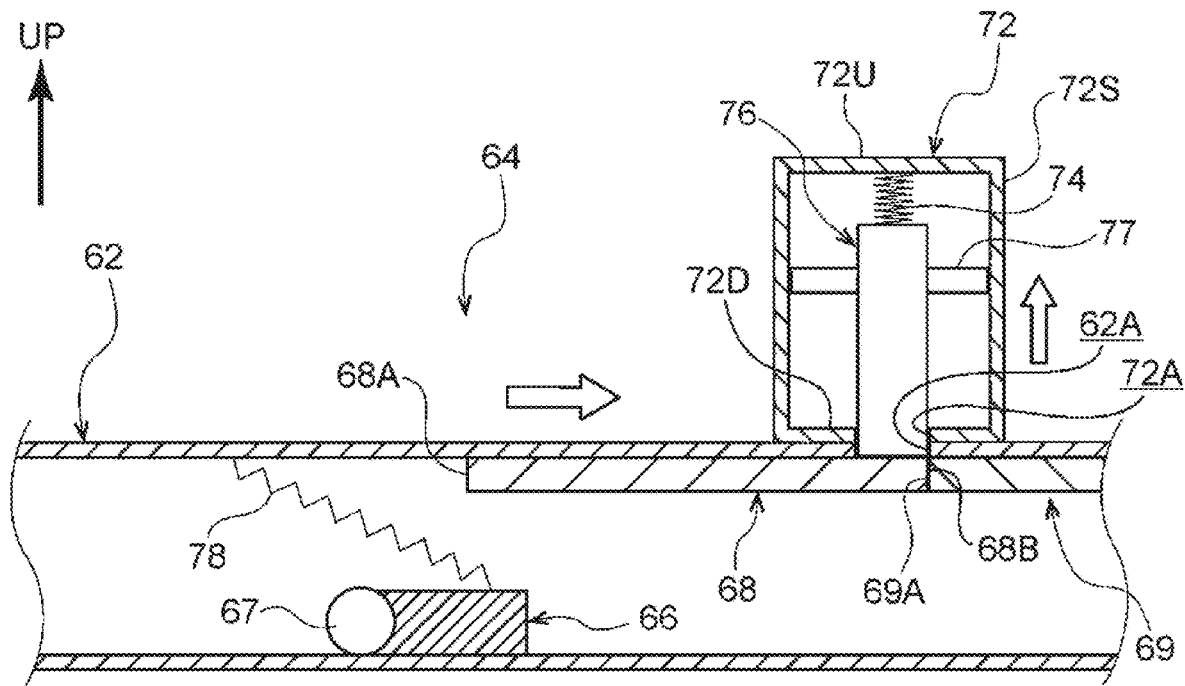
FIG. 4B is a schematic configuration diagram illustrating the switching valve after supplying gas for the cushion airbag device according to the embodiment of the present disclosure.

Therefore, when the vehicles collide, the ignition device is controlled by the control device 70 to ignite the explosive K, as shown in FIG. 4B. As a result, the restricting member 76 is instantaneously raised in the case 72 via the flange portion 77. Consequently, the upstream-side wall surface 76A of the lower end portion of the restricting member 76 protruding from the opening 72A of the lower wall 72D and the opening 62A of the second pipe 62 is instantaneously disengaged from the downstream-side end surface 68B of the stopper 68.

Thus, since the support of the partition wall 66 by the stopper 68 is instantaneously released, the partition wall 66 is pushed down from the upstream side by the high-pressure gas, and the high-pressure gas is instantaneously supplied to the inside of the cushion airbag 30. When the partition wall 66 falls down, the stopper 68 is pushed by the partition wall 66 and also slides to the downstream side. That is, the opening 62A of the second pipe 62 is closed by the stopper 68. Therefore, the high-pressure gas does not leak out of the second pipe 62.

When all of the high-pressure gas is supplied to the inside of the cushion airbag 30, the partition wall 66 returns to its original state by the biasing force of the tension-coil spring 78. That is, as shown in FIG. 4A, the second pipe 62 is closed. As described above, the switching valve 64 can be reused by filling the case 72 with the explosive K again.

Next, the operation of the cushion airbag device 10 according to the present embodiment configured as described above will be described.

Figure 6:
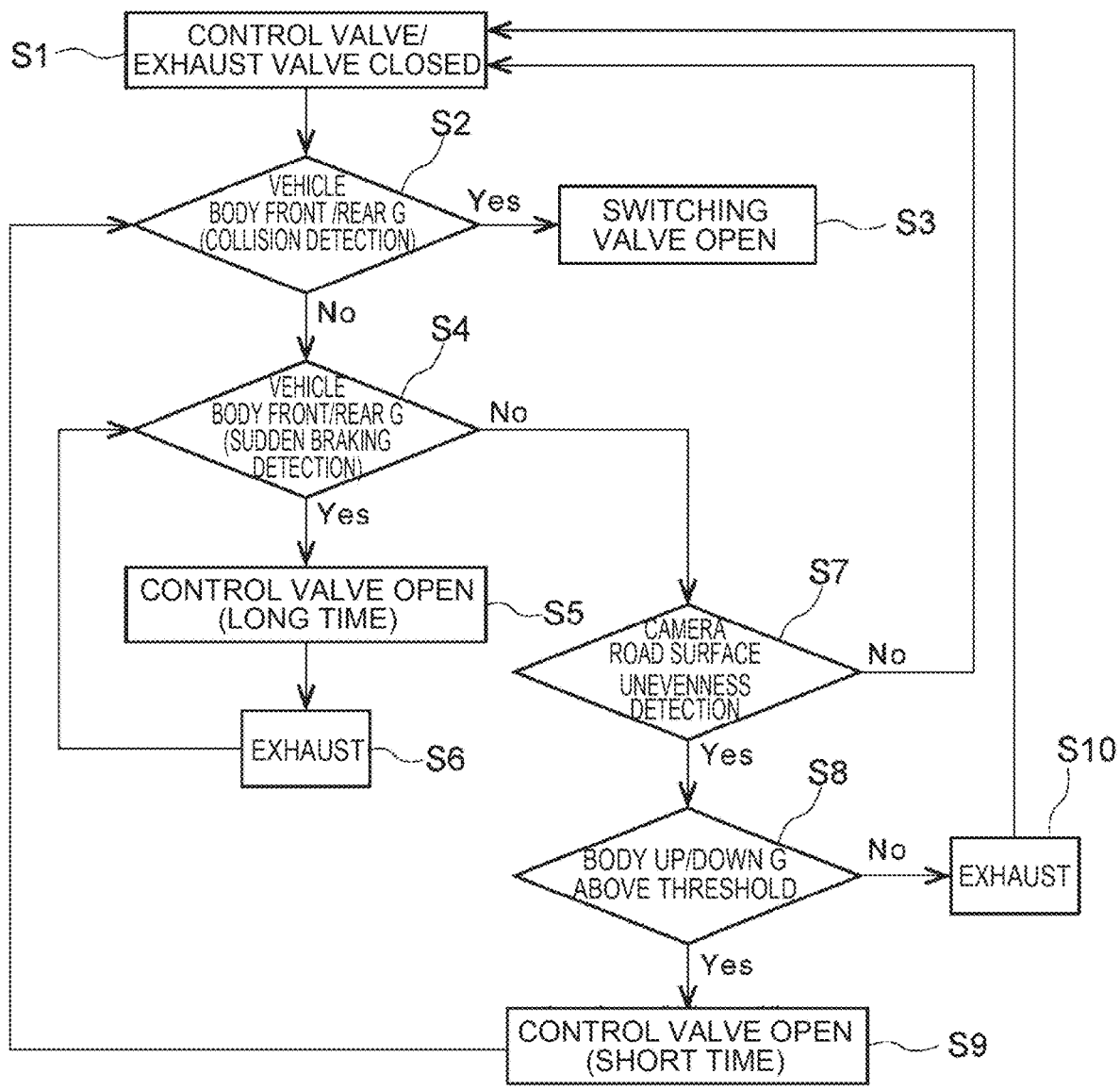
FIG. 6 is a flowchart illustrating an operation step of the cushion airbag device according to the embodiment of the present disclosure.

As described above, the cushion airbag 30 is disposed between the base member 16 constituting the seat cushion 14 and the cushion pad 18. As shown in FIG. 5A, the cushion airbag 30 is not filled (exhausted) during normal running of the vehicle. That is, as shown in FIG. 6, the control valve 54 and the exhaust valve 58 are closed (S1), and the occupant P seated on the seat cushion 14 is supported by the base member 16 and the cushion pad 18.

Therefore, it is possible to prevent the hardness of the seat cushion 14 from becoming unnecessarily high due to the cushion airbag 30 during normal running of the vehicle. As a result, it is possible to avoid impairment of riding comfort (seating comfort) performance of the occupant P by the seat cushion 14. In other words, since the internal pressure of the cushion airbag 30 can be adjusted (including a state in which no gas is contained) during normal running of the vehicle, it is possible to suppress or prevent deterioration in riding comfort (seating comfort) performance.

Next, in S2, it is determined whether or not the acceleration (G) of the vehicle in the front-rear direction is equal to or greater than a predetermined first threshold. When a frontal crash of the vehicle that is greater than or equal to the first threshold is detected (or predicted), the switching valve 64 is instantaneously opened (S3) as shown in FIG. 4B. As a result, as shown in FIG. 5B, the gas is instantaneously supplied from the high-pressure tank 50 to the inside of the cushion airbag 30, and the cushion airbag 30 is inflated vertically.

That is, a part of the cushion pad 18 constituting the seat cushion 14 (the front portion of the buttocks of the occupant P) is raised. Therefore, it is possible to reduce the downward displacement of the occupant P when the vehicle collides, and it is possible to suppress the lowering of the waist restraining force caused by the lap belt 13A of the seat belt 13.

On the other hand, in S2, when it is determined that the acceleration (G) in the front-rear direction of the vehicle is less than the predetermined first threshold value, it is determined in S4 whether or not the acceleration (G) in the front-rear direction of the vehicle is equal to or more than the predetermined second threshold value smaller than the first threshold value. When an urgent braking that is greater than or equal to the second threshold is detected (or predicted), the control valve 54 is opened (S5). At this time, the opening time of the control valve 54 is relatively long, and a relatively large amount of gas is supplied from the high-pressure tank 50 to the inside of the cushion airbag 30. That is, the internal pressure of the cushion airbag 30 is high.

Therefore, the lower displacement of the occupant P during the emergency braking of the vehicle can be reduced, and the lowering of the waist restraining force due to the lap belt 13A of the seat belt 13 can be suppressed. When the urgent braking of the vehicle is completed, the exhaust valve 58 is opened, and the gas is exhausted from the inside of the cushion airbag 30 (S6). Then, in S4, it is determined whether or not the acceleration (G) of the vehicle in the front-rear direction is equal to or greater than a predetermined second threshold.

On the other hand, in S4, when it is determined that the acceleration (G) of the vehicle in the front-rear direction is less than the second predetermined threshold value, it is determined in S7 whether or not there is an unevenness equal to or greater than a predetermined level on the road surface by an in-vehicle camera (not shown) or the like, and when there is no unevenness, the process returns to S1. When there are irregularities, it is determined in S8 whether or not the vertical acceleration (G) of the vehicle is equal to or greater than a predetermined threshold value, and when it is determined that the acceleration is equal to or greater than the threshold value, the control valve 54 is opened for a predetermined period (S9).

That is, the opening time of the control valve 54 at this time is shorter than the opening time at the time of S5, and the amount of the gases supplied from the high-pressure tank 50 to the inside of the cushion airbag 30 is small. Therefore, the internal pressure of the cushion airbag 30 is low, and the cushion airbag 30 is a soft (low hardness) cushion airbag.

Therefore, the internal pressure of the cushion airbag 30 is set to a high pressure when the vehicle travels on a rough road having irregularities of a predetermined level or more on the road surface. As a result, it is possible to effectively suppress a decrease in the ride comfort performance as compared with a case where the cushion airbag has a high hardness. In S8, when the vertical acceleration (G) of the vehicle is less than the predetermined threshold, the exhaust valve 58 is opened (S10) and S1 returns.

As described above, according to the cushion airbag device 10 of the present embodiment, it is possible to suppress a decrease in the ride comfort performance of the occupant P during normal traveling of the vehicle. Further, it is possible to reduce the downward displacement of the occupant P when the vehicle collides, and it is possible to suppress a decrease in the waist restraining force caused by the lap belt 13A of the seat belt 13. That is, according to the present embodiment, it is possible to achieve both the securing of the riding comfort performance during the normal running of the vehicle and the suppression or prevention of the occurrence of the submarine phenomenon during the collision of the vehicle.

In addition, the cushion airbag 30 is configured such that two base fabrics 32 are sewn along the outer peripheral edge and folded two times along the crease C, so that the base fabrics are stacked one on top of the other. The cushion airbag 30 has an intake passage 34 along the crease C and an intake port 36 at one end of the crease C, and is fixed to the submarine reinforcement 28 in a state where the crease C is positioned on the front side.

Therefore, with the cushion airbag 30 having a limited volume, the thickness thereof can be increased. In addition, since the cushion airbag 30 has a large thickness difference, it is possible to effectively reduce the amount of downward displacement of the occupant P at the time of collision of the vehicle or emergency braking of the vehicle. Consequently, it is possible to effectively suppress a decrease in the waist restraining force caused by the lap belt 13A of the seat belt 13.

The switching valve 64 includes a partition wall 66 capable of closing the passage of the second pipe 62 and a stopper 68 supporting the partition wall 66, and is a mechanical valve in which the stopper 68 momentarily releases the support for the partition wall 66 when the vehicle collides. Therefore, the switching valve 64 is supplied with the gases to the cushion airbag 30 more quickly than when the switching valve is a solenoid valve, for example, so that the waist restraint by the lap belt 13A of the seat belt 13 can be accelerated.

The operation of the cushion airbag device 10 according to the present embodiment is as described above, but the cushion airbag device 10 may be configured as shown in FIG. 3B. That is, the second pipe 62 may be eliminated, the inflator 80 may be mechanically connected to the cushion airbag 30, and the inflator 80 and the control device 70 may be electrically connected.

According to this configuration, when the vehicle collides, the gas can be instantaneously supplied from the inflator 80 to the inside of the cushion airbag 30 under the control of the control device 70. Therefore, as described above, it is possible to reduce the downward displacement of the occupant P when the vehicle collides, and it is possible to suppress a decrease in the waist restraint force caused by the lap belt 13A of the seat belt 13. That is, the occurrence of the submarine phenomenon can be suppressed or prevented.

Here, S3 of the flow chart shown in FIG. 6 is "inflator operation" instead of "switching valve opening". In this case, since only one pipe is connected to the high-pressure tank 50 and the cushion airbag 30 in communication with each other, the pipe is referred to as a "pipe 52" instead of the "first pipe 52". That is, in this case, the control valve 54 is provided in the pipe 52, and the branch pipe 56 is integrally provided in the pipe 52 between the control valve 54 and the cushion airbag 30.

The cushion airbag device 10 according to the present embodiment has been described above with reference to the drawings. However, the cushion airbag device 10 according to the present embodiment is not limited to the illustrated one, and can be appropriately changed in design without departing from the gist of the present disclosure. For example, the position of the crease C when the cushion airbag 30 is folded into two can be changed in accordance with the structure of the seat cushion 14 of the vehicle seat 12 (the shape and inclination of the base member 16 and the cushion pad 18).

In addition, the vehicle seat 12 in the present embodiment may be a front seat that is a captain seat, and in this case, the cushion airbag 30 is disposed between a seat spring (not shown) and the cushion pad 18. The cushion airbag 30 is not limited to the submarine reinforcement 28 and may be a cross member (not shown) extending in the seat width direction of the vehicle seat 12. In addition, an exhaust valve 58 may be used together with the control valve 54 to adjust the internal pressure of the cushion airbag 30.

What is claimed is:

1. A cushion airbag device comprising:
   a cushion airbag configured to be provided at a lower portion of a seat cushion in a vehicle seat of a vehicle, wherein the cushion airbag is configured to inflate in an up-down direction of the vehicle when gas is supplied from a pressure accumulation tank;
   a control valve that is provided in a first pipe communicating the cushion airbag with the pressure accumulation tank, wherein the control valve is configured to adjust an internal pressure of the cushion airbag;
   an exhaust valve that is provided in the first pipe between the control valve and the cushion airbag, wherein the exhaust valve is configured to exhaust the gas from an inside of the cushion airbag; and
   a switching valve that is provided in a second pipe communicating the cushion airbag with the pressure accumulation tank, wherein the switching valve is configured to open at a time of a collision of the vehicle.

2. The cushion airbag device according to claim 1, wherein the switching valve
   includes a partition wall that enables the second pipe to be closed, and a stopper configured to support the partition wall, and
   is a mechanical valve in which a support from the stopper with respect to the partition wall is instantaneously released at the time of the collision of the vehicle.

3. A cushion airbag device comprising:
a cushion airbag configured to be provided at a lower portion of a seat cushion in a vehicle seat of a vehicle, wherein the cushion airbag is configured to inflate in an up-down direction of the vehicle when gas is supplied from a pressure accumulation tank;
a control valve that is provided in a first pipe communicating the cushion airbag with the pressure accumulation tank, wherein the control valve is configured to adjust an internal pressure of the cushion airbag;
an exhaust valve that is provided in the first pipe between the control valve and the cushion airbag, wherein the exhaust valve is configured to exhaust the gas from an inside of the cushion airbag; and
a switching valve that is provided in a second pipe communicating the cushion airbag with the pressure accumulation tank, wherein the switching valve is configured to open at a time of a collision of the vehicle,
wherein when a vehicle body vertical acceleration exceeds a predetermined threshold during traveling of the vehicle, the control valve is opened for a predetermined time.

4. The cushion airbag device according to claim 1, wherein the cushion airbag
is configured in which two base fabrics are sewn along an outer peripheral edge, and are folded in two along a crease line so as to be stacked one on top of another,
has an intake path along the crease line and an intake port at one end of the crease line, and
is fixed to a cross member provided between side frames constituting the seat cushion in a state in which the crease line is positioned on a seat front side.

5. A cushion airbag device comprising:
a cushion airbag that is provided at a lower portion of a seat cushion in a vehicle seat, and inflates in an up-down direction when gas is supplied from a pressure accumulation tank;
a control valve that is provided in a pipe communicating the cushion airbag with the pressure accumulation tank and adjusts an internal pressure of the cushion airbag;
an exhaust valve that is provided in the pipe between the control valve and the cushion airbag and exhausts the gas from an inside of the cushion airbag; and
an inflator that operates at a time of a collision of a vehicle and supplies gas to the inside of the cushion airbag.

6. The cushion airbag device according to claim 5, wherein when a vehicle body vertical acceleration exceeds a predetermined threshold during traveling of the vehicle, the control valve is opened for a predetermined time.

7. The cushion airbag device according to claim 5, wherein the cushion airbag
is configured in which two base fabrics are sewn along an outer peripheral edge, and are folded in two along a crease line so as to be stacked one on top of another,
has an intake path along the crease line and an intake port at one end of the crease line, and
is fixed to a cross member provided between side frames constituting the seat cushion in a state in which the crease line is positioned on a seat front side.

* * * * *